US010941300B2

United States Patent
Lepo et al.

(10) Patent No.: US 10,941,300 B2
(45) Date of Patent: Mar. 9, 2021

(54) COMPOSITION FOR MODIFYING RHEOLOGY OF COATING COLOR, ITS USE AND A COATING COLOR

(71) Applicant: Kemira Oyj, Helsinki (FI)

(72) Inventors: Anneli Lepo, Tampere (FI); Helena Peuranen, Espoo (FI)

(73) Assignee: Kemira Oyj, Helsinki (FI)

( * ) Notice: Subject to any disclaimer, the term of this patent is extended or adjusted under 35 U.S.C. 154(b) by 287 days.

(21) Appl. No.: 16/078,114

(22) PCT Filed: Mar. 22, 2017

(86) PCT No.: PCT/FI2017/050198
§ 371 (c)(1),
(2) Date: Aug. 21, 2018

(87) PCT Pub. No.: WO2017/162921
PCT Pub. Date: Sep. 28, 2017

(65) Prior Publication Data
US 2020/0062967 A1    Feb. 27, 2020

(30) Foreign Application Priority Data
Mar. 22, 2016    (FI) .................................. 20165235

(51) Int. Cl.
| | |
|---|---|
| C09D 4/00 | (2006.01) |
| C09D 4/06 | (2006.01) |
| C09D 7/61 | (2018.01) |
| C08K 3/013 | (2018.01) |
| C08F 2/22 | (2006.01) |
| C08F 2/44 | (2006.01) |
| C08F 212/08 | (2006.01) |
| C08F 220/18 | (2006.01) |
| C08K 3/20 | (2006.01) |
| C08K 3/26 | (2006.01) |
| C08L 3/02 | (2006.01) |
| C08K 3/22 | (2006.01) |
| D21H 19/54 | (2006.01) |

(52) U.S. Cl.
CPC .................. *C09D 4/06* (2013.01); *C08F 2/22* (2013.01); *C08F 2/44* (2013.01); *C08F 212/08* (2013.01); *C08F 220/18* (2013.01); *C08K 3/013* (2018.01); *C08K 3/20* (2013.01); *C08K 3/26* (2013.01); *C08L 3/02* (2013.01); *C09D 7/61* (2018.01); *C08F 220/1804* (2020.02); *C08K 2003/2241* (2013.01); *C08K 2003/265* (2013.01); *D21H 19/54* (2013.01)

(58) Field of Classification Search
None
See application file for complete search history.

(56) References Cited

U.S. PATENT DOCUMENTS

| | | | |
|---|---|---|---|
| 5,358,998 A | 10/1994 | Wendel et al. | |
| 6,255,427 B1 | 7/2001 | Exner et al. | |
| 6,426,381 B1* | 7/2002 | Konig | .................. C08F 212/08 524/734 |
| 6,800,675 B1 | 10/2004 | Pfalz et al. | |
| 8,685,207 B2* | 4/2014 | Song | ........................ C08F 2/24 162/168.1 |
| 2010/0159263 A1 | 6/2010 | Ahlgren et al. | |
| 2010/0160498 A1* | 6/2010 | Aarni | ..................... D21H 19/58 524/48 |
| 2013/0184407 A1* | 7/2013 | Peuranen | .............. C08F 251/00 524/734 |
| 2014/0275415 A1 | 9/2014 | Cimpeanu et al. | |
| 2014/0302335 A1 | 10/2014 | Seyffer et al. | |

OTHER PUBLICATIONS

Finnish Patent and Registration Office, Search report issued for appln. No. 20165235 dated Oct. 11, 2016.

* cited by examiner

*Primary Examiner* — Stefanie J Cohen
(74) *Attorney, Agent, or Firm* — Berggren LLP

(57) ABSTRACT

The invention relates to a composition for modifying rheology of coating colour and its use. The composition comprises an aqueous polymer dispersion, comprising a copolymer of monomer (a), which is at least one optionally substituted styrene, and monomer (b), which is at least one C1-C4-alkyl (meth)acrylate. The copolymer has a particle size D50<100 nm. Composition comprises also degraded starch having an average molecular weight Mn<1000 g/mol.

20 Claims, No Drawings

COMPOSITION FOR MODIFYING RHEOLOGY OF COATING COLOR, ITS USE AND A COATING COLOR

PRIORITY

This application is a U.S national application of the international application number PCT/FI2017/050198 filed on Mar. 22, 2017 and claiming priority of Finnish national application No. 20165235 filed on Mar. 22, 2016 the contents of all of which are incorporated herein by reference.

The present invention relates to a composition for modifying rheology of coating color, its use and a coating color according to the preambles of the enclosed independent claims.

Paper, board or the like can be coated with a coating color. Coating color typically comprises particles of inorganic mineral, such as calcium carbonate or kaolin; binder, such as latex or starch; as well as optional other additives, such as rheology modifiers. Rheology modifiers are used to change the flow characteristics of the coating color, to enable good water retention and viscosity behavior of the coating color. Water retention of the coating color describes the ability of the coating color to maintain the aqueous phase in contact with the inorganic mineral particles. Water retention enables the build-up of even hydrodynamic pressure under the metering blade, good runnability and smooth coating surface. If the water retention of the coating color is too low, the water in the coating color is adsorbed by the base paper too quickly, and the coating is settled on the paper surface too rapidly. There is a need for rheology modifiers for coating colors that can provide good water retention and have good viscosity behavior both at low and high shear.

It is known to use starch, carboxymethyl cellulose, polyvinyl alcohol or synthetic thickeners as rheology modifiers. They improve the water retention to the coating color, but simultaneously also increase the viscosity of the coating color. Therefore they can be used only in limited amounts, and the improvements in water retention must be balanced with the problems resulting from increased coating viscosity. Thus there is a need for a rheology modifier that can provide good water retention and have good viscosity behavior.

Styrene acrylate copolymers are used in pulp and papermaking for various purposes, such as surface sizing compositions or for increasing the dry strength of paper. For example, U.S. Pat. No. 6,426,381 discloses styrene/(meth)acrylate copolymers that can be used for surface sizing. The aqueous polymer dispersion is obtained by copolymerization of ethylenically unsaturated monomers in the presence of starch.

An object of this invention is to minimise or even eliminate the disadvantages existing in the prior art.

An object is also to provide a composition, which provides optimal water retention and viscosity behavior when used in a coating color.

These objects are attained with a method and an arrangement having the characteristics presented below in the characterising parts of the independent claims. Some preferable embodiments of the invention are described in the dependent claims.

A typical composition according to the present invention for modifying rheology of coating color comprises an aqueous polymer dispersion, comprising a copolymer of
 monomer (a), which is at least one optionally substituted styrene, and
 monomer (b), which is at least one C1-C4-alkyl (meth)acrylate,
the copolymer having a particle size D50<100 nm, and degraded starch having an average molecular eight $M_n$<1000 g/mol.

Typical coating color according to the present invention for coating of paper, board or the like comprises inorganic mineral particles and composition according to the present invention.

A typical use according to the present invention of the composition according to the invention is as an additive for a coating color for improving the water retention of the coating color.

Now it has been surprisingly found that a composition comprising a mixture of a polymer dispersion of styrene acrylate copolymer and degraded starch, which has an average molecular weight $M_n$<1000 g/mol provides unexpected improvements when the composition is used in a coating color, such as rheology modifier. The composition provides the coating color with excellent water retention and viscosity properties, both at low shear and at high shear. The origin of the observed effects is not yet fully understood. It is assumed, without wishing to be bound by a theory that the strongly degraded starch is capable of effectively forming hydrogen bonds with other constituents of the coating color and thus retaining water in the coating color, while maintaining the viscosity at low level. It is unexpected that the degree of degradation of starch has so strong positive effect on the properties of the coating color.

According to one embodiment of the invention the amount of degraded starch in the composition is in the range of 1-70 weight-%, preferably 3-60 weight-%, more preferably 5-50 weight-%, calculated from the total dry solids content of the composition.

According to one embodiment of the invention the amount of polymer dispersion in the composition is in the range of 30-99 weight-%, preferably 40-97 weight-%, more preferably 50-95 weight-%, calculated from the total dry solids content of the composition.

According to the present invention the low number average molecular weight of the degraded starch reduces the viscosity increase of the coating color. Simultaneously the use of strongly degraded starch increases the retention of water into the coating color composition. This improves the behavior of the coating color especially in blade coating and the runnability of the coating color at the coating blade. The coating color is not subjected to a viscosity increase under the blade pressure and the strongly degraded starch helps to retain water optimally in the coating layer, thus providing a smooth and defect-free coating result. According to one preferable embodiment of the invention the composition comprises degraded starch that has an average molecular weight $M_n$<1000 g/mol, preferably <800 g/mol, more preferably <500 g/mol. The average molecular weight $M_n$ of the degraded starch may be in the range of 50-990 g/mol, preferably 100-790 g/mol, more preferably in the range of 100-490 g/mol, even more preferably 100-400 g/mol. The average molecular weight of the starch can be determined, for example, by using size-exclusion chromatography (SEC) employing following equipment and procedure: Viscotek GPCmax TDA 302 SEC equipment, column set comprising three columns (Waters Ultrahydrogel 2000, 500 and 120) and a guard column. Eluent is aqueous 0.1 M $NaNO_3$ with 2.5% (v/v) acetonitrile with a flow rate of 0.8 ml/min in 35° C. Injection volume is 50 µL with a sample concentration of 2 mg/ml. Signal from the differential refractive index detector is used for conventional column calibration with sodium polyacrylate standards. Ethylene glycol is used as an internal standard.

Degraded starch, which is suitable for use in the present invention, may be obtained by subjecting starch to oxidative, thermal, acidic, hydrolytic or enzymatic degradation. The oxidative degradation is presently being preferred. Hypochlorite, peroxodisulphate, hydrogen peroxide or their mixtures may be used as oxidising agents. According to one embodiment starch is degraded with hypochlorite in order to improve the dissolution properties of the starch, and after that a further degradation, for example with hydrogen peroxide, is carried out. In this case, hydrogen peroxide (calculated as 100%) is used in concentrations of 0.3 to 5.0 weight-%, based on starch employed. The exact amount of hydrogen peroxide depends on the final molecular weight to which the starch is to be degraded.

Degraded starch, which may be used in the present invention, may be any suitable degraded natural starch, such as potato, rice, corn, waxy corn, wheat, barley or tapioca starch. Starches having an amylopectin content >80%, preferably >95% are advantageous.

The degraded starch may be non-ionic or it may have a net anionic charge. Degraded starch with net anionic charge is preferred. In context of the present application the starch which has anionic net charge may be anionic, i.e. contain only anionically charged groups, or amphoteric, i.e. contain both anionically and cationically charged groups, as long as the net charge of the degraded starch is anionic. Anionic or amphoteric starch comprises anionic groups, such as carboxylate or phosphate groups. Degree of substitution, DS, indicating the number of anionic groups in the starch on average per glucose unit, is typically 0.01-0.20. According to one preferable embodiment of the invention the degraded starch is degraded anionic potato or tapioca starch.

It is also possible to use chemically modified starches, such as hydroxyethyl- or hydroxypropyl-starches.

The degraded starch is dissolved into water by heating, whereby an aqueous solution of degraded starch is obtained. According to one embodiment of the invention the viscosity of the degraded starch in solution form is <15 mPas, preferably <10 mPas, measured from 15 weight-% solution, at 25° C., with Brookfield LVDV viscometer with spindle 18, 60 rpm.

The aqueous polymer dispersion, which is used for the composition according to the invention, comprises a copolymer which is obtained preferably by free radical emulsion copolymerization of monomer (a), which is at least one optionally substituted styrene, and monomer (b), which is at least one C1-C4-alkyl (meth)acrylate. According to one preferable embodiment the monomer (a) is selected from group comprising styrene, substituted styrenes, such as α-methylstyrene or vinyltoluene, and any mixtures thereof. Suitable monomer (b) may be selected from monomers from a group of C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferred embodiment of the invention the monomer (b) is selected from butyl (meth)acrylates. It can comprise, for example, a mixture of at least two isomeric butyl acrylates. More preferably, the monomer component (b) is n-butyl acrylate, tert-butyl acrylate or a mixture of n-butyl acrylate and tert-butyl acrylate. For mixtures of two monomers (b) the mixing ratio may be from 1:99 to 99:1, sometimes from 10:90 to 90:10.

According to one embodiment of the present invention the polymer dispersion comprises a copolymer, which is obtained by copolymerization of monomers (a) and (b), as well as at least one optional monomer (c), which is ethylenically unsaturated and different from monomers (a) and (b). Suitable ethylenically unsaturated copolymerizable monomers (c) are ethylhexyl acrylate, stearyl acrylate, stearyl methacrylate, esters of acrylic and methacrylic acid with alcohols which have more than four C atoms, and further acrylonitrile, methacrylonitrile, acrylamide, vinyl acetate or anionic co-monomers, such as acrylic acid, methacrylic acid, itaconic acid, maleic acid or styrene sulphonic acid. Acrylic acid and styrene sulphonic acid are preferred.

The amount of monomer (a) may be 0.1-75 weight-%, preferably 5-60 weight-%, more preferably 10-55 weight-%, calculated from the total dry solids content of the monomers (a), (b) and optional (c). The amount of monomer (b) may be 25-99.9 weight-%, preferably 30-95 weight-%, more preferably 35-90 weight-%, calculated from the total dry solids content of the monomers (a), (b) and optional (c). The amount of the optional monomer (c) may be 0.1-15 weight-%, preferably 0.1-10 weight-%, more preferably 0.1-7 weight-%, calculated from the total dry solids content of the monomers (a), (b) and (c).

According to one preferable embodiment of the invention the polymer dispersion comprises a copolymer which is obtained by free radical emulsion polymerization of at least the above described monomers (a), (b) and optional (c) in the presence of a polysaccharide. Polysaccharide may be starch or it may be selected from any polysaccharide, which contains a free hydroxyl group, such as amylose, amylopectine, carrageen, cellulose, chitosan, chitin, dextrines, guar gum (guarane) and other galactomannans, arabic gum, hemicellulose components, and pullulan, for obtaining styrene acrylate copolymer used in the present invention. Starch and dextrin are being preferred as polysaccharides.

According to one preferable embodiment of the invention the polymer dispersion comprises a styrene acrylate copolymer, which is obtained by free radical emulsion polymerization of the above described monomers (a), (b) and optional (c) in the presence of starch, preferably degraded starch. Starch may be any suitable native starch, such as potato, rice, corn, waxy corn, wheat, barley or tapioca starch, potato starch being preferred. Starches having an amylopectin content >80%, preferably >95% are advantageous. Starch used in the polymerization may be also modified, for example, anionised, cationised or degraded.

According to one preferable embodiment of the invention the polymer dispersion comprises a styrene acrylate copolymer, which is obtained by free radical emulsion polymerization of the above described monomers (a), (b) and optional (c) in the presence of strongly degraded starch. The degraded starch which is used in the polymerization may be same or different from the degraded starch, which is used to form the composition according to the present invention together with the polymer dispersion. According to one preferable embodiment of the invention the starch used in the polymerization is strongly degraded starch, which has an average molecular weight <1000 g/mol, preferably in the range of 100-990 g/mol, more preferably 100-790 g/mol, even more preferably in the range of 100-490 g/mol, sometimes even more preferably 100-400 g/mol. The average molecular weight is determined in the same manner as described earlier in this application. Degraded starch which is used in polymerization may obtained by subjecting the starch to oxidative, thermal, acidic or enzymatic degradation, oxidative degradation being preferred.

The degraded starch which is used in polymerization may be non-ionic or have an anionic net charge, Starch which has anionic net charge may be anionic, i.e. contain only anionically charged groups, or amphoteric, i.e. contain both anionically and cationically charged groups, as long as the net charge is anionic. Degraded starch is preferably anionic or amphoteric with the net anionic charge. Anionic or amphoteric starch comprises anionic groups, such as carboxylate or phosphate groups.

According to one embodiment of the invention, when the polymer dispersion is obtained by polymerization in presence of degraded starch, the amount of degraded starch in the polymer dispersion is in the range of 9-97 weight-%, preferably 12-92 weight-%, more preferably 16-83 weight-%, calculated from the total dry solids content of the polymer dispersion.

The degraded starch solution may be heated to a value above its glutenization temperature before the beginning of the polymerization. Typically the polymerization is performed at temperature range 30-100° C., preferably between 70-98° C. The temperature may be >100° C. in case a pressure reactor under superatmospheric pressure is employed. The amount of degraded starch in the reaction mixture at the beginning of the polymerization and before the addition of the monomers is in the range of 5-60 weight-%, preferably 10-45 weight-%, more preferably 11-35 weight-%, calculated from the content of the reaction mixture at the beginning of the polymerization.

The polymer dispersion is obtained by carrying out the polymerization by addition of the monomers, which have been described above, either individually or as a mixture, and the free radical initiators suitable for initiating the polymerization, preferably to an aqueous polysaccharide solution, more preferably to a solution of degraded starch having an average molecular weight <1000 g/mol. Thus the reaction mixture for the polymerization is formed. The polymerization process is typically carried in the absence of oxygen, preferably in an inert gas atmosphere, for example under nitrogen. According to one embodiment of the invention the total amount of monomers in the reaction mixture is 10-92 weight-%, preferably 20-90 weight-%, more preferably 35-88 weight-%, calculated from the total dry solids content of the reaction mixture. The amount of monomers refers here to the total amount of monomers (a), (b) and optional (c), which are added to the reaction mixture during the polymerization process. The monomers are normally added during a pre-determined time period.

After the end of the addition of the monomers and an initiator, the reaction mixture is usually allowed to continue reacting for some time in order to complete the polymerization. The reaction times typically are between 0.5 and 10 hours, preferably between 0.75 and 5 hours. After this subsequent reaction time, a certain amount of initiator may added again in order to polymerise as substantially as possible the residual monomers still present in the reaction mixture.

The pH of the resulting polymer dispersion may be adjusted after the polymerization by adding suitable bases, such as alkali metal hydroxides and alkali metal acetates, preferably sodium hydroxide solution, potassium hydroxide solution or ammonia. A pH value in the range of 4-7 is preferably established thereby. Furthermore, buffer substances may also be added in order to stabilize the pH over the storage time.

The concentration, i.e. dry solids content, of the obtained polymer dispersion according to the invention may be >30 weight-%, more typically >35%, preferably 35-60 weight-%, more preferably 35-57 weight-%, based on the weight of the total dispersion.

When degraded starch is used in the polymerization the obtained aqueous polymer dispersion may have viscosity ≤150 mPas, measured at 40 weight-% solids content, at 25° C., by using Brookfield LVDV viscometer with spindle 18 and using the highest feasible rotation speed for the spindle. Preferably the aqueous polymer dispersion has the viscosity in the range of 1-150 mPas, preferably 5-100 mPas, more preferably 5-70 mPas, even more preferably 5-49 mPas, measured at 40 weight-% solids content, at 25° C., by using Brookfield LVDV viscometer with spindle 18.

According to one embodiment of the invention the polymer dispersion has particle size D50 value <85 nm, preferably <80 nm, more preferably <75 nm and/or D99 value <160 nm, preferably <150 nm, more preferably <130 nm, sometimes even <115 nm. Typical polymer dispersion has D50 value in the range of 45-85 nm, preferably 45-80 nm, more preferably 45-75 nm, sometimes even 45-70 nm. Typical polymer dispersion has D90 value in the range of 70-160 nm, preferably 90-140 nm, more preferably 100-135 nm. All the particle sizes are measured by using Zetasizer Nano ZS, Malvern. D50 and D90 values refer to the respective values for $50^{th}$ and $90^{th}$ percentile of a volume based distribution.

According to one preferable embodiment the composition is a mixture of an aqueous polymer dispersion and an aqueous solution of degraded starch. The composition according to the present invention may be formed by mixing the polymer dispersion with the degraded starch before the composition is added to the coating color. Alternatively the polymer dispersion and the degraded starch can be added separately, preferably simultaneously, to the coating color, whereby the composition is formed in the coating color. Preferably the degraded starch is mixed with the polymer dispersion to form the composition before the addition to the coating color.

The composition comprising aqueous polymer dispersion and degraded starch may be used as coating color additive, such as rheology modifier. Coating color can be used for coating of paper, board or the like. Coating color is here understood as a slurry, which comprises water, binder, inorganic mineral particles and additive(s). Suitable inorganic mineral particles that may be used in the present invention are selected from a group consisting of calcium carbonate, kaolin, calcinated kaolin, talc, titanium dioxide, gypsum, chalk, satine white, barium sulphate, sodium aluminum silicate, aluminum hydroxide and any of their mixtures. Calcium carbonate may be ground calcium carbonate (GCC) or precipitated calcium carbonate (PCC) or their mixture. Preferably the inorganic mineral is calcium carbonate. Particle size D50 of the inorganic mineral particles used in coating compositions is typically in the range of <5 μm.

Typical binders that may be used in the present invention are starch and/or synthetic binders. Starch, which can be used as natural binder, may be native starch or modified starch, e.g. degraded starch or substituted starch. Typical synthetic binders are latex polymers based on butadiene, styrene, vinyl acetate, butyl acrylate and acrylic acid monomers. Typical synthetic latex binders that may be used in the present invention are latices known in the art, such as styrene butadiene (SB), styrene acrylate (SA) or polyvinyl acetate (PVAc) latices. Preferably the latex binder is styrene butadiene (SB) latex. Synthetic latex binders have a particle size around 0.1-0.2 μm.

The amount of synthetic binder in the coating color is in the range of 0.1-50 parts, preferably 1-25 parts, more preferably 1-20 parts.

The composition according to the present invention can be used together with natural and/or synthetic binders. It is also possible to use the composition as sole binder in the coating color.

Typically the coating color according to the present invention has a solids content of 50-74%, preferably 60-72%, more preferably 65-71% and low shear viscosity <3500, typically 100-2000 mPas. Viscosities are measured by using Brookfield viscometer, type DV-II, with speed 100 rpm and using spindle 3 or 4.

The composition may be used in amount of 1-50, preferably 1-30 parts, more preferably 1-20 parts.

The amount of degraded starch in coated paper, board or the like may be 0.001-20 weight-%, preferably 0.05-15 weight-%, more preferably 0.1-10 weight-%, calculated from the dry solids of the final paper, board or the like.

As customary in the art, the amounts of coating components are given in parts. The amounts are calculated in relation to the amount of inorganic mineral particles in the coating composition, and all the amounts are calculated and given as dry and active matter.

EXPERIMENTAL

Some embodiments of the invention are illustrated in the following non-limiting examples.

EXAMPLE 1

Preparation of Composition 70.4 g of an oxidatively degraded potato starch (Perfectamyl A 4692) was dispersed with stirring in 266 g of demineralizer water in a 1 l glass reactor with a cooling/heating jacket under a nitrogen atmosphere. The starch was dissolved by heating the mixture to 95° C. during 60 minutes. After the dissolution of starch, pH was adjusted to 2 with sulphuric acid. After 5 min mixing, 2.17 g of 1.0% strength aqueous solution of ferrous(II)sulphate heptahydrate was added in to the reactor. After 5 minutes 3.47 g of 30% strength hydrogen peroxide was added. After 30 minutes, the starch degradation was complete. The chemical feeds were started.

Monomers were fed as a mixture: 210.8 g of mixture of n-butyl acrylate and styrene (1:1 weight) was fed during 200 minutes. 41.0 g of 4.5% solution of hydrogen peroxide was fed simultaneously with the monomer feeds during 205 min. The reactor temperature was kept at 95° C. during the feeds and 15 minutes after for postpolymerization. Then the mixture was cooled to 60° C. and 0.57 g of 70% strength tert-butyl hydroperoxide solution was added into the reactor. The temperature was kept at 60° C. for further 60 min. Thereafter, cooling was effected to 40° C. and 2.2 g of 10% strength ethylenediaminetetraacetic acid sodium salt (EDTA-Na) solution was added, followed by pH adjustment to 6.2 with 50% strength sodium hydroxide solution and cooling to room temperature. Filtration was performed using a 100 µm filter cloth. A finely divided dispersion with a solid content of 45.6%, particle size 66 nm, viscosity 148 mPas, was obtained.

In a separate 1 l glass reactor with a cooling/heating jacket under a nitrogen atmosphere 148.3 g of an oxidatively degraded potato starch (Perfectamyl A 4692) was dispersed with stirring in 276 g of demineralizer water. The starch was dissolved by heating the mixture to 95° C. during 60 minutes. After the dissolution of starch, pH was adjusted to 2 with sulphuric acid. After 5 min mixing, 1.52 g of 1.0% strength aqueous solution of ferrous (II) sulphate heptahydrate was added in to the reactor. After 5 minutes 7.27 g of 30% strength hydrogen peroxide was added. After 120 minutes, the starch degradation was complete, and it was cooled to room temperature. A starch solution with a solid content of 28.1% was obtained. The solution of degraded starch was mixed with the polymer dispersion in the ratio 10:90 weight-%.

Example 2

Preparation of Coating Color and Experiments

The following procedure is used for coating color make down for coating color 1:

100 parts of ground calcium carbonate (GCC), 75%, particle size <2 µm, and 4.5 parts styrene-butadiene latex is mixed together. 7 parts of cooked native starch, at solids content 28 weight-% is added to the mixture of GCC and latex. Water is added in order to obtain a coating color with target solids content of 60 weight-%. pH of the coating color is adjusted to pH 9.2 by using 10% sodium hydroxide. The coating color batch size is 500 g of dry inorganic mineral pigment.

Low shear viscosity is measured from the prepared coating color with Brookfield viscometer, type DV-II with speed 100 rpm using spindle 3. High shear viscosity is measured using Hercules Hi-Shear DV-10 rational viscometer. Static water retention is measured with Åbo Akademi Gravimetric Water Retention device.

Coating color 2 is prepared in similar manner as coating color 1, but 4.5 parts of styrene butadiene latex is replaced with 4.5 parts of polymer dispersion and 0.5 parts of degraded starch is added after native starch. Polymer dispersion corresponds to that prepared in Example 1 and degraded starch corresponds to that prepared in Example 1.

Coating color 3 is prepared in similar manner as coating color 1, but 0.5 parts of degraded starch is added after native starch. Used degraded starch corresponds to that prepared in Example 1.

Coating color compositions are given in Table 1 and the obtained measurement results in Table 2.

TABLE 1

Coating color compositions used in Example 1.

| | Coating color 1 | Coating color 2 | Coating color 3 |
|---|---|---|---|
| GCC | 100 | 100 | 100 |
| Styrene Butadiene Latex | 4.5 | — | 4.5 |
| Polymer dispersion | — | 4.5 | — |
| Native starch | 7 | 7 | 7 |
| Degraded starch | — | 0.5 | 0.5 |

TABLE 2

Measurement results for coating colors studied in Example 1.

| Property | Coating color 1 | Coating color 2 | Coating color 3 |
|---|---|---|---|
| pH | 9.2 | 9.2 | 9.2 |
| Solids Content [weight-%] | 60 | 60 | 60 |
| Temperature [° C.] | 23.1 | 23.1 | 23.1 |
| Low Shear Viscosity [mPas] | 304 | 290 | 290 |
| High Shear Viscosity [mPas] | 37 | 36 | 36 |
| Water Retention [g/m$^3$] | 68 | 28 | 71 |

From Table 2 it can be seen that when strongly degraded starch is added to the coating composition, the static water retention of the coating color has improved without increase in coating color high shear viscosity.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A coating color for coating of paper or board, the coating color comprising inorganic mineral particles and a composition for modifying rheology of the coating color, wherein the composition is a mixture of an aqueous polymer dispersion and an aqueous solution of degraded starch, the composition comprising:
   30-99 weight-% of the aqueous polymer dispersion, calculated from a total dry solids content of the composition, the polymer dispersion comprising a copolymer of:
   0.1-75 weight-% of a monomer (a), which is at least one optionally substituted styrene, and
   25-99.9 weight-% of a monomer (b), which is at least one C1-C4-alkyl (meth)acrylate,
   wherein the weight-% is calculated from a total dry solids content of the monomers (a) and (b), and
   wherein the copolymer has a particle size D50<100 nm; and
   1-70 weight-% of the degraded starch having an average molecular weight Mn<1000 g/mol, calculated from the total dry solids content of the composition.

2. The coating color according to claim 1, wherein the amount of the degraded starch in the composition is in a range of 3-60 weight-%, calculated from the total dry solids content of the composition.

3. The coating color according to claim 1, wherein the amount of the polymer dispersion in the composition is in a range of 40-97 weight-%, calculated from the total dry solids content of the composition.

4. The coating color according to claim 1, wherein the degraded starch has an average molecular weight Mn<800 g/mol.

5. The coating color according to claim 1, wherein the degraded starch has an average molecular weight Mn in a range of 50-990 g/mol.

6. The coating color according to claim 1, wherein the degraded starch is non-ionic or the degraded starch has a net anionic charge.

7. The coating color according to claim 6, wherein the degraded starch is degraded anionic potato or degraded tapioca starch.

8. The coating color according to claim 1, wherein the monomer (a) is selected from a group comprising styrene, substituted styrenes, and any mixtures thereof.

9. The coating color according to claim 1, wherein the monomer (b) is selected from butyl (meth)acrylates.

10. The coating color according to claim 1, wherein the copolymer is obtained by copolymerization of the monomers (a) and (b), as well as at least one monomer (c), which is ethylenically unsaturated and different from the monomers (a) and (b).

11. The coating color according to claim 10, wherein the monomer (c) is selected from a group consisting of ethylhexyl acrylate; stearyl acrylate; stearyl methacrylate; esters of acrylic and methacrylic acid with alcohols which have more than four C atoms; acrylonitrile; methacrylonitrile; acrylamide; vinyl acetate; and anionic co-monomers selected from acrylic acid, methacrylic acid, itaconic acid, maleic acid and styrene sulphonic acid.

12. The coating color according to claim 1, wherein the copolymer has a particle size D50<85 nm.

13. The coating color according to claim 1, wherein the polymer dispersion comprising the copolymer is obtained by free radical emulsion polymerization of at least the monomers (a) and (b) in the presence of a polysaccharide.

14. The coating color according to claim 13, wherein the polysaccharide is starch or dextrin.

15. The coating color according to claim 14, wherein the polysaccharide is degraded starch which has an average molecular weight in a range of 100-990 g/mol.

16. The coating color according to claim 1, wherein the inorganic mineral particles are selected from a group consisting of calcium carbonate, kaolin, calcinated kaolin, talc, titanium dioxide, gypsum, chalk, satine white, barium sulphate, sodium aluminum silicate, aluminum hydroxide and any of their mixtures.

17. The coating color according to claim 2, wherein the amount of the degraded starch in the composition is in a range of 5-50 weight-%, calculated from the total dry solids content of the composition.

18. The coating color according to claim 8, wherein the monomer (a) is selected from a group comprising styrene, α-methylstyrene or vinyltoluene, and any mixtures thereof.

19. The coating color according to claim 15, wherein the polysaccharide is degraded starch which has an average molecular weight in a range of 100-790 g/mol.

20. The coating color according to claim 15, wherein the polysaccharide is degraded starch which has an average molecular weight in a range of 100-490 g/mol.

* * * * *